US008539795B2

(12) United States Patent
Dannoux et al.

(10) Patent No.: US 8,539,795 B2
(45) Date of Patent: Sep. 24, 2013

(54) METHODS FOR CUTTING A FRAGILE MATERIAL

(75) Inventors: Thierry Luc Alain Dannoux, Avon (FR); Philippe Lehuede, Yerres (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/319,200

(22) PCT Filed: May 13, 2010

(86) PCT No.: PCT/US2010/034663
§ 371 (c)(1),
(2), (4) Date: Nov. 7, 2011

(87) PCT Pub. No.: WO2010/132637
PCT Pub. Date: Nov. 18, 2010

(65) Prior Publication Data
US 2012/0047957 A1 Mar. 1, 2012

(51) Int. Cl.
*C03B 21/02* (2006.01)
(52) U.S. Cl.
USPC .................................. 65/97; 65/98
(58) Field of Classification Search
USPC ...................... 65/90–101, 105, 112
See application file for complete search history.

(56) References Cited

U.S. PATENT DOCUMENTS

| 4,682,003 A | | 7/1987 | Minakawa et al. ............ 219/121 |
| 5,622,540 A | * | 4/1997 | Stevens ............................ 65/112 |
| 5,776,220 A | * | 7/1998 | Allaire et al. .................... 65/112 |
| 5,916,460 A | * | 6/1999 | Imoto et al. .............. 219/121.67 |
| 6,327,875 B1 | * | 12/2001 | Allaire et al. .................... 65/103 |
| 6,423,930 B1 | * | 7/2002 | Matsumoto .............. 219/121.69 |
| 6,502,423 B1 | * | 1/2003 | Ostendarp et al. ........... 65/29.14 |
| 6,653,210 B2 | * | 11/2003 | Choo et al. ..................... 438/460 |
| 2002/0170896 A1 | * | 11/2002 | Choo et al. ............... 219/121.72 |
| 2007/0051469 A1 | * | 3/2007 | Bossi et al. ..................... 156/344 |
| 2007/0062921 A1 | | 3/2007 | Karube et al. ........... 219/121.72 |
| 2008/0104997 A1 | * | 5/2008 | Koseki ............................ 65/97 |
| 2008/0236199 A1 | * | 10/2008 | Sklyarevich et al. ............. 65/97 |
| 2009/0320524 A1 | * | 12/2009 | Abramov et al. ............... 65/112 |
| 2010/0206008 A1 | * | 8/2010 | Harvey et al. ................... 65/105 |
| 2010/0212361 A1 | * | 8/2010 | Abramov et al. ............... 65/105 |
| 2010/0279067 A1 | * | 11/2010 | Sabia et al. .................... 428/141 |
| 2012/0047956 A1 | * | 3/2012 | Li ................................... 65/112 |

FOREIGN PATENT DOCUMENTS

| JP | 2004-276386 | 10/2004 |
| JP | 2006-137168 | 6/2006 |
| JP | 2007-76077 | 3/2007 |
| JP | 2007-105888 | 4/2007 |
| JP | 2008-49498 | 3/2008 |
| JP | 2008-115067 | 5/2008 |
| JP | 2008-127224 | 6/2008 |
| WO | 2004/087390 | 10/2004 |

* cited by examiner

*Primary Examiner* — Jodi C Franklin
(74) *Attorney, Agent, or Firm* — Kevin M. Able

(57) ABSTRACT

Methods for cutting a fragile material are provided. The methods comprise the step of heating the fragile material along a separation path to separate the fragile material into a first portion and a second portion. At least the first portion includes a first thermal affected zone extending along the separation path. The methods further include the steps of spontaneously splitting at least part of the first thermal affected zone from the remainder of the first portion along a first split path extending a first distance from the separation path. The spontaneous splitting occurs as a consequence of the step of heating the fragile material.

17 Claims, 3 Drawing Sheets

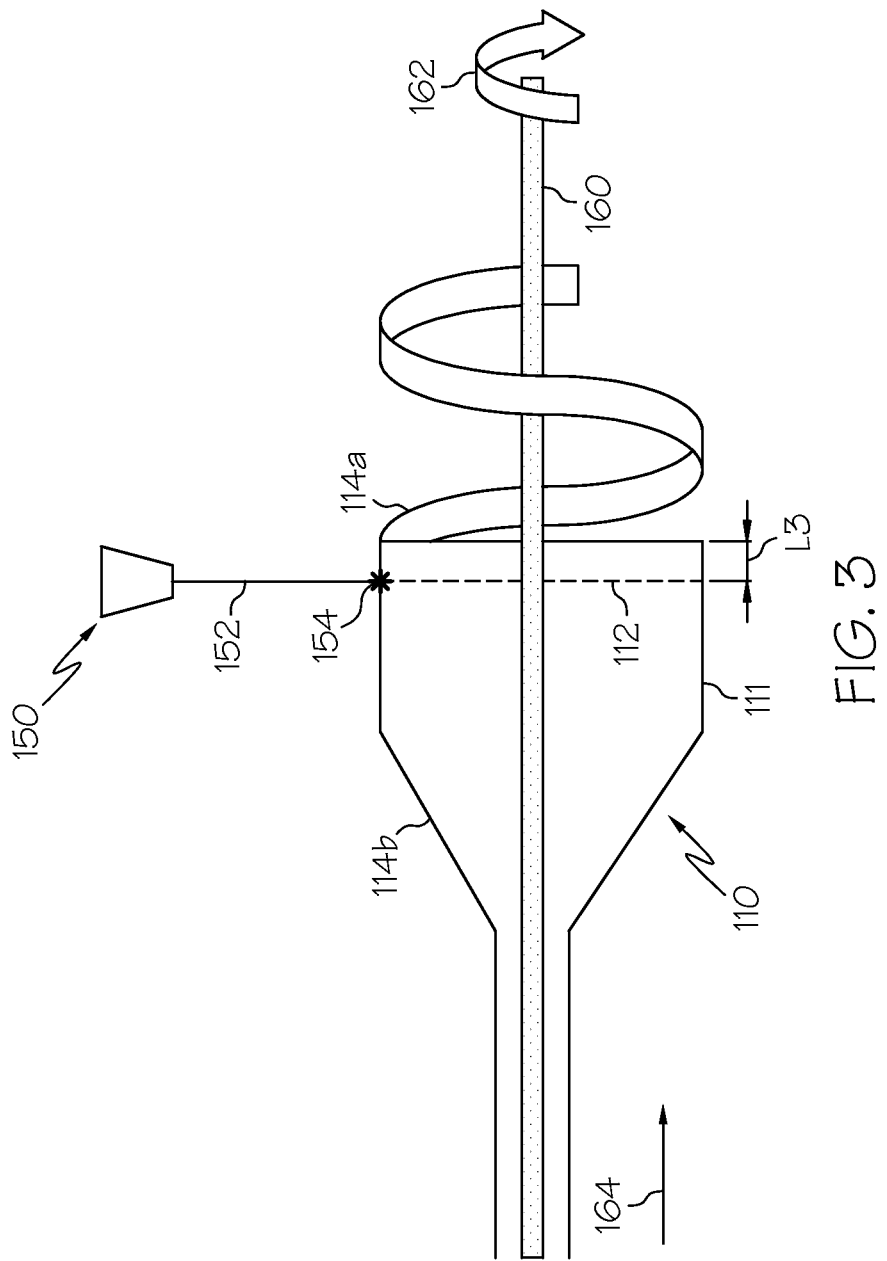

METHODS FOR CUTTING A FRAGILE MATERIAL

CLAIMING BENEFIT OF PRIOR FILED APPLICATION

This application claims the benefit of European Application Serial No. 09305427.8, filed on May 13, 2009. The content of this document and the entire disclosure of publications, patents, and patent documents mentioned herein are incorporated by reference.

FIELD

The present invention relates generally to methods for cutting, and more particularly, to methods for cutting a fragile material.

BACKGROUND

Formation of glass sheets is desirable for various applications. After initial formation, glass sheets frequently need to be cut apart to obtain a final glass product having the desired peripheral shape and edge characteristics. There is a need to provide cutting techniques for fragile material to provide convenient separation while presenting edges having favorable characteristics.

SUMMARY

In one example aspect, a method for cutting a fragile material is provided. The method includes the step of heating the fragile material along a separation path to separate the fragile material into a first portion and a second portion. At least the first portion includes a first thermal affected zone extending along the separation path. The method further includes the step of spontaneously splitting at least part of the first thermal affected zone from the remainder of the first portion along a first split path extending a first distance from the separation path. The spontaneous splitting occurs as a consequence of the step of heating the fragile material.

BRIEF DESCRIPTION OF THE DRAWINGS

These and other features, aspects and advantages of the present disclosure are better understood when the following detailed description is read with reference to the accompanying drawings, in which:

FIG. 3 is a schematic view of one embodiment of a system for cutting a glass sheet from a glass bulb wherein the glass sheet includes a substantially clean edge.

DETAILED DESCRIPTION

Figure 1A:
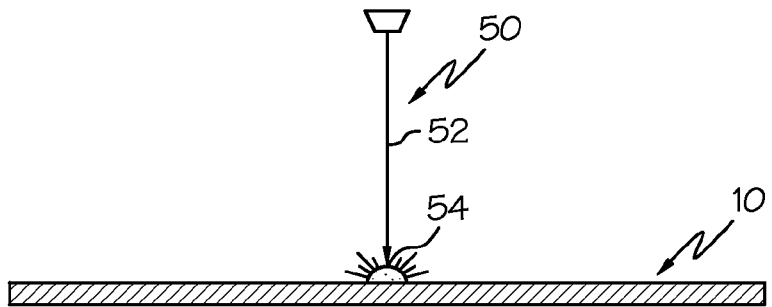
FIG. 1A is a sectional view along line 1A-1A of FIG. 2.

Methods will now be described more fully hereinafter with reference to the accompanying drawings in which example embodiments of the disclosure are shown. Whenever possible, the same reference numerals are used throughout the drawings to refer to the same or like parts. However, this disclosure may be embodied in many different forms and should not be construed as limited to the embodiments set forth herein.

Example methods herein involve fragile materials that are brittle with a low thickness. The fragile materials can have a wide range of thicknesses. For example, a thin glass can be used having a thickness "T" that is equal to or less than 150 µm, such as from about 5 µm to about 150 µm. In another example, a thin glass having a thickness "T" from about 20 µm to about 100 µm can be used, although other thicknesses may be incorporated with further examples.

Fragile materials may comprise glass such as transparent, translucent, colored, or other glass types. In a further example, fragile materials may comprise a polymer such as a composite including glass and a polymer. In further examples, the fragile material may comprise crystalline material such as a quartz composition, ceramic, or glass ceramic. Fragile materials may be used for a variety of applications. In one example, the fragile material may comprise a glass for a display assembly, such as a liquid crystal display or other display device. For instance, as shown, a fragile material 10 may be provided that includes a flexible glass material configured for use with flexible display applications. Such a flexible glass material may allow the displays to be rolled into a storage configuration and can allow the fragile material to process in an efficient manner. The fragile material can be constructed at a wide variety of shapes such as planar, cylindrical, conical, frustoconical shape, or other shapes.

The methods described herein include cutting the fragile material 10. Examples of cutting can include initial scoring, etching, or complete cut through where each results in separating the fragile material 10. Heating the fragile material 10 can be achieved using various techniques. For example, heating can be applied at substantially all locations along a path. Alternatively, the heating can be applied at spaced locations along the path. Still further, the heating application can be continuous or pulsed. For example, the heating application can comprise a pulsed or non-pulsed heat source applied at spaced locations or at substantially all locations along the path.

Various heat sources may be used to apply the heat to the fragile material 10. For example, FIG. 1A illustrates a schematic view of a heating source 50 that may be used in accordance with examples of the disclosure. In one example, the heating source 50 may comprise an apparatus that can provide heat at the fragile material surface and cause desired internal stresses for creating a thermal affected zone discussed more fully below. For example, the heating source 50 may include a laser emitting at a wavelength between 10 µm and 11 µm, such as a $CO_2$ laser emitting at a 10.6 µm wavelength. However, other emission wavelengths may also be applied, depending on the optical absorption properties of the fragile material.

The heating source 50 and the fragile material 10 can be moved relative to one another during the step of heating. The relative movement can be achieved by a variety of configurations. For instance, the fragile material 10 can be fixed while the heating source 50 or a portion of the heating source (e.g. the heating beam 52 and heating spot 54) moves along the direction of the separation path 12. The portion of the heating source 50 can also comprise a mirror designed to control the direction of the heating beam 52 and hence the location of the heating spot 54. Therefore, relative movement can be achieved by rotating or moving the mirror or other part of the heating source 50 relative to the fragile material 10. Alternatively, the heating source 50 can be fixed while the fragile material 10 moves along the direction of the separation path 12. As another example, both the heating source 50 (or a portion of the heating source) and the fragile material 10 can move at the same time such that the relative movement causes the heating beam 52 and heating spot 54 to move along the direction of the separation path 12.

Alternatively, all or a plurality of desired portions along the separation path 12 can be heated simultaneously. For instance, a single or multiple heating sources can be used to simultaneously heat different areas along the separation path 12. For example, a plurality of heating sources may be arranged to simultaneously heat different areas of the separation path 12 as the heating sources are moved relative to the fragile material 10. In still further examples, a single or multiple heating sources can be used to simultaneously heat different areas of the separation path 12 without relative movement between the one or more heating sources and the fragile material 10. For instance, rather than heating at a point, the heating device may be designed to simultaneously heat some or all desired portions along the separation path 12. For instance, a laser array can simultaneously emit a series of beams that heats along a line, rather than a point, to simultaneously heat a segment or all desired portions of the separation path 12.

Figure 2:
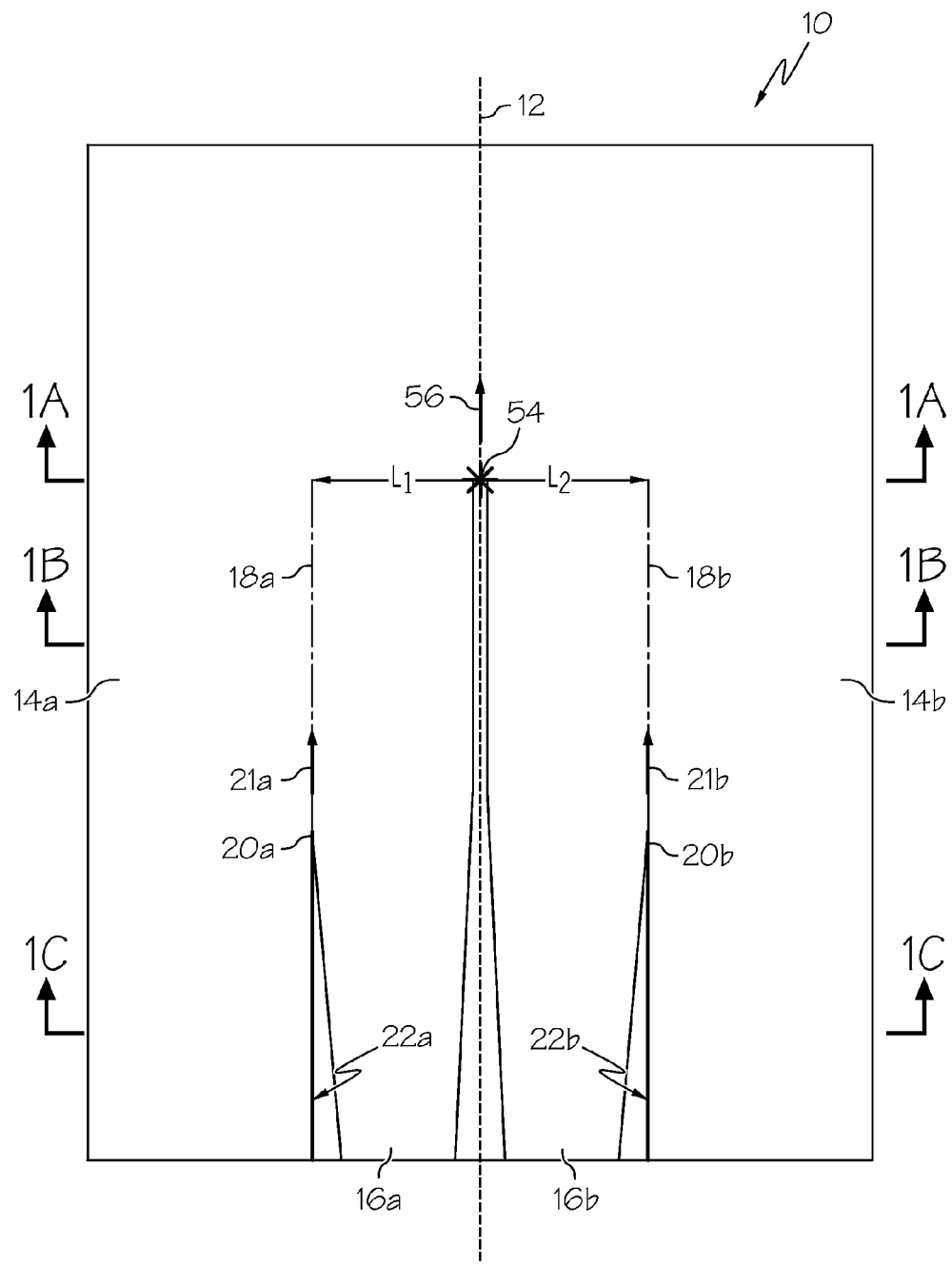
FIG. 2 is a top schematic view of a method according to one example.

As shown in FIG. 2, the fragile material 10 can be heated along a separation path 12 to separate the fragile material 10 into a first portion 14a and a second portion 14b. The separation path 12 can extend in two or three dimensions. For example, as shown in FIG. 2, the separation path 12 can comprise a substantially straight line, although other path configurations may be incorporated in further examples. For instance, the separation path 12 may have curved segments, straight segments or other segment types that substantially extend in two dimensions along a planar surface of the fragile material 10. In further examples, the separation path 12 can comprise a path that extends in three-dimensions. For example, as described more fully below with respect to FIG. 3, a separation path 112 extends along a conically shaped fragile member 110. Thus, the separation path 112 comprises a conical spiral, although paths with other shapes may be incorporated in further examples.

Heating the fragile material 10 along the separation path 12 is configured to provide internal stresses within the first portion 14a sufficient to result in at least partial spontaneous splitting of at least part of a first thermal affected zone 16a from the remainder of the first portion 14a along a first split path 18a. The first split path 18a can extend along the separation path 12. In one example, the first split path 18a can have the same shape as the separation path 12. For example, as shown in FIG. 2, the first split path 18a can be offset and parallel with respect to the separation path 12. In a further example, the first split path 18a may extend at an angle with respect to the separation path 12 and/or have a different shape than the separation path 12. For example, the heating source 50 may provide varying heat treatments along the separation path 12 or the fragile material characteristics may differ along the separation path 12. Varying the heat treatment may therefore be used to provide a first split path 18a that has a different shape than the separation path 12.

The step of heating can also be modified by changing a plurality of process parameters of the heating step to accommodate changes of a plurality of characteristics of the fragile material 10. The plurality of characteristics of the fragile material 10 may include the thickness "T" of the fragile material 10 and the coefficient of thermal expansion of the fragile material 10. The plurality of process parameters of the heating step may comprise the heating power and/or the relative movement between the fragile material 10 and the heating source 50.

Figure 1B:
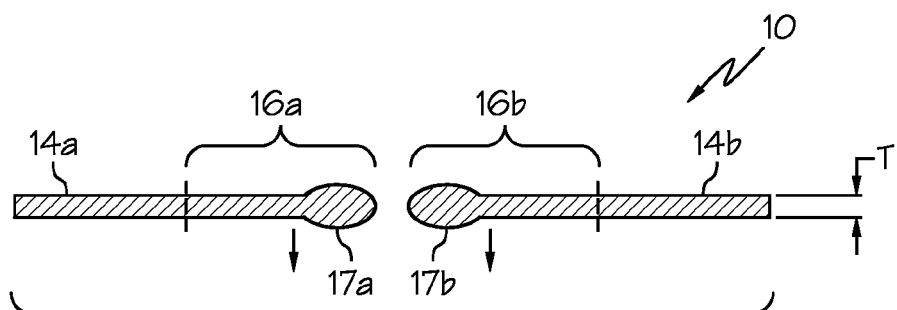
FIG. 1B is a sectional view along line 1B-1B of FIG. 2.
Figure 1C:
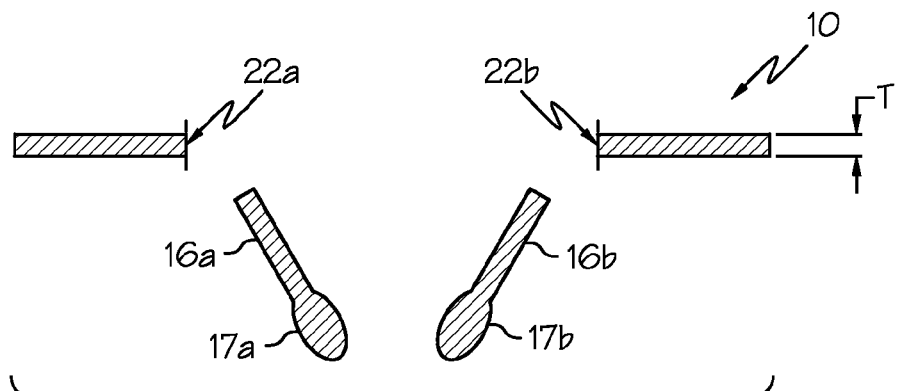
FIG. 1C is a sectional view along line 1C-1C of FIG. 2.

FIGS. 1C and 2 illustrate spontaneous splitting of at least part of the first thermal affected zone 16a from the remainder of the first portion 14a along the first split path 18a extending a first distance $L_1$ from the separation path 12. The first distance $L_1$ between the first split path 18a and the separation path 12 is the width of the first thermal affected zone 16a. As shown, the first distance $L_1$ is about 1 mm, although other distances may be provided in further examples. As shown in FIG. 2, the first distance $L_1$ may be substantially constant along the separation path 12, and the first split path 18a may be substantially parallel to the separation path 12. As discussed above, the first split path 18a may not be parallel with the separation path 12. In such examples, the first distance $L_1$ may vary along the separation path 12 as a function of variations in attributes (properties) of the fragile material such as thickness, or process variables such as environmental conditions and/or cutting parameters (e.g. laser power). Consistency of $L_1$, and therefore straightness of the resulting edge, is therefore dependent on maintaining consistent process variables and/or attributes of the fragile material The spontaneous splitting occurs as a consequence of the step of heating the fragile material 10. Because of the thermal effect of the heating step, sufficient internal stresses are created within the first portion 14a to facilitate spontaneous generation and/or propagation of a first crack 20a along the first split path 18a. In one example, the fragile material 10 may be weakened, such as by scoring, along the first split path 18a to provide an initial crack location. Alternatively, as shown, weakening is not needed, wherein the first crack 20a is formed during spontaneous splitting of the first thermal affected zone 16a from the remainder of the first portion 14a. As shown in FIG. 2, the first crack 20a can propagate along the first split path 18a in a direction 21a to cause the spontaneous splitting of at least part of the first thermal affected zone 16a from the remainder of the first portion 14a along the first split path 18a as shown in FIG. 2. The spontaneous splitting may happen, for example, shortly after heat treating. For instance, the spontaneous splitting may occur 3 seconds, 2 seconds, or 1 second after the step of heating.

As shown in FIG. 1C, the step of spontaneously splitting provides the first portion 14a with a first clean edge 22a extending along the first split path 18a. The first clean edge 22a can provide a substantially defect free edge portion with a reduced number of surface imperfections, such as cracks, pits, or other imperfections. Further, the clean edge has a thickness that is substantially the same as surrounding portions without internal stresses typically found in a bulbous end portion 17a of the first thermal affected zone 16a. As the first thermal affected zone 16a has split off, the reminder of the first portion 14a has a clean edge without bulbous end portion 17a, cracks, or other imperfections.

Optionally, heating the fragile material 10 along the separation path 12 can also be configured to provide internal stresses within the second portion 14b sufficient to result in at least partial spontaneous splitting of at least part of a second thermal affected zone 16b from the remainder of the second portion 14b along a second split path 18b. The second split path 18b can also extend along the separation path 12. In one example, the second split path 18b can have the same shape as the separation path 12. In another example, the second split path 18b can be offset from the separation path 12 and have the same shape as the separation path 12. For example, as shown in FIG. 2, the second split path 18b can be offset and parallel with respect to the separation path 12. In a further example, the second split path 18b may extend at an angle with respect to the separation path 12 and/or have a different shape than the separation path 12. For example, the heating source 50 may provide varying heat treatments along the separation path 12 or the fragile material characteristics may differ along the separation path 12. Varying the heat treatment may therefore be used to provide a second split path 18b that has a different shape than the separation path 12.

FIGS. 1C and 2 illustrate spontaneous splitting of at least part of the second thermal affected zone 16b from the remainder of the second portion 14b along the second split path 18b extending a second distance $L_2$ from the separation path 12. The second distance $L_2$ between the second split path 18b and the separation path 12 is the width of the second thermal affected zone 16b. As shown, the second distance $L_2$ is about 1 mm, although other distances may be provided in further examples. As shown in FIG. 2, the second distance $L_2$ may be substantially constant along the separation path 12, and the second split path 18b may be substantially parallel to the separation path 12. As discussed above, the second split path 18b may not be parallel with the separation path 12. In such examples, the second distance $L_2$ may vary along the separation path 12. In one example, the first distance $L_1$ may be substantially equal to the second distance $L_2$ although different arrangements may be provided in further examples.

The spontaneous splitting occurs as a consequence of the step of heating the fragile material 10. Because of the thermal effect of the heating step, sufficient internal stresses are created within the second portion 14b to facilitate spontaneous generation and/or propagation of a second crack 20b along the second split path 18b. In one example, the fragile material 10 may be weakened, such as by scoring, along the second split path 18b to provide an initial crack location. Alternatively, as shown, weakening is not needed, wherein the second crack 20b is formed during spontaneous splitting of the second thermal affected zone 16b from the remainder of the second portion 14b. As shown in FIG. 2, the second crack 20b can propagate along the second split path 18b in a direction 21b to cause the spontaneous splitting of at least part of the second thermal affected zone 16b from the remainder of the second portion 14b along the second split path 18b as shown in FIG. 2. The spontaneous splitting may happen, for example, shortly after heat treating. For instance, the spontaneous splitting may occur 3 seconds, 2 seconds, or 1 second after the step of heating.

As shown in FIG. 1C, the step of spontaneously splitting provides the second portion 14b with a second clean edge 22b extending along the second split path 18b. The second clean edge 22b can provide a substantially defect free edge portion with a reduced number of surface imperfections, such as cracks, pits, or other imperfections. Further, the clean edge has a thickness that is substantially the same as surrounding portions without internal stresses typically found in a bulbous end portion 17b of the second thermal affected zone 16b. As the second thermal affected zone 16b has split off, the reminder of the second portion 14b has a clean edge without bulbous end portion 17b, cracks, or other imperfections.

As mentioned previously the thickness "T" of the fragile material 10 can be equal to or less than 150 µm such that the internal stress due to the heating is sufficient to generate cracks all through the entire thickness of the fragile material 10. As the cracks extend through the entire thickness of the fragile material 10, the thermally affected zones can be spontaneously split from the remaining portions of the fragile material 10. For instance, the fragile material 10 in this invention can comprise a thin glass with a thickness "T" that is from about 5 µm to about 150 µm in flexible display applications. The coefficient of thermal expansion can also be a noted characteristic of the fragile material 10 in the present invention. For instance, the fragile material 10 can comprise glass with a coefficient of thermal expansion from 10 to $70 \times 10^{-7}$/K between 25-300° C., for example, from 20 to $50 \times 10^{-7}$/K between 25-300° C.

Regarding the heating power and the moving speed of the heating step, an example is given with respect to the cutting of an ultra thin glass material using a $CO_2$ laser. The $CO_2$ laser power is from about 50 W to about 150 W during the step of heating while the glass heated at a speed from about 10 mm/s to about 300 mm/s along a direction of the separation path 12. In one example, the glass is heated at a speed from about 20 mm/s to about 300 mm/s.

Experimental results regarding the relationship between the process parameters of the heating step (i.e. laser power and moving speed) and the characteristics of the glass (i.e. thickness) is summarized in Table 1 below. The thinner glass requires a faster moving speed of cutting for a given laser power. In Table 1, all cutting tests are done on Pyrex glass with a Synrad rf-excited $CO_2$ laser at a power of 80 W. The focal spot diameter of the laser is 131 µm, the laser beam diameter is 7.2 mm, and the focusing lens of the laser is 6.36 cm (2.5 inches) for all tests.

TABLE 1

|  | Test | | |
| --- | --- | --- | --- |
|  | 1 | 2 | 3 |
| Glass thickness (µm) | 120 | 100 | 70 |
| Moving speed (mm/s) | 25-30 | 35-40 | 40-45 |

An example method will now be described with respect to FIG. 2. A heating source 50 can be moved in a direction 56 such that the heating spot 54 travels along the separation path 12. As a result, the fragile material 10 is heated along the separation path 12 to separate the fragile material 10 into the first portion 14a and the second portion 14b. Due to the heating, the first portion 14a includes the first thermal affected zone 16a and the second portion 14b includes the second thermal affected zone 16b. At least part of the first thermal affected zone 16a spontaneously splits from the remainder of the first portion 14a by a first crack 20a propagating along direction 21a. Likewise, at least part of the second thermal affected zone 16b spontaneously splits from the reminder of the second portion 14b by a second crack 20b propagating along direction 21b.

Another example method is shown schematically in FIG. 3. In this embodiment, the heating source 50 may be a $CO_2$ laser 150 positioned to cut a glass sheet 114a with a clean edge from a glass bulb 114b having cylindrical shaped portion 111 extending from a frustoconical shape root. The $CO_2$ laser 150 may be a 10.6 µm wavelength Synrad rf-excited $CO_2$ laser with a maximum power of 80 W and beam diameter of 7.2 mm. The laser beam 152 of the $CO_2$ laser 150 may be focused on the surface of the glass bulb 114b with a 6.36 cm (2.5 inches) focusing lens to produce a focal spot 154 with the diameter of 131 µm. In order to cut glass having a thickness of up to about 150 µm, the power of the $CO_2$ laser 150 may be from about 50 W to about 80 W.

The glass bulb 114b may be Pyrex glass bulb with a cylindrical shaped portion 111 as shown in FIG. 3. The thickness of the glass bulb 114b may be from about 60 µm to about 100 µm. The glass bulb 114b can be attached to a rod 160 that continuously rotates in a direction as indicated by arrow 162. The glass bulb 114b may also move along a direction as indicated by arrow 164. The $CO_2$ laser 150 and the focal spot 154 on the surface of the glass bulb 114b are fixed while the glass bulb 114b moves and rotates, which results in a relative move of the focal spot 154 along the direction of spiral three dimensional separation path 112 at a speed determined by the rotating speed of the rod 160 and the moving speed of the glass bulb 114b. For instance, the relative moving speed of the focal spot 154 may be from about 20 mm/s to about 60 mm/s. The distance $L_3$ between the focal spot 154 and the outer edge of the glass bulb 114b defines the width of the glass sheet 114a, and may be substantially constant during the cutting. The $CO_2$ laser 150 may also be positioned at an angle or pitch relative to the glass such that the glass sheet 114a is spirally cut from the cylindrical shaped portion 111 of the glass bulb 114b. The pitch may be set by adjusting the angular orientation of the cutting device with respect to the glass bulb 114b. The pitch of the $CO_2$ laser 150, in conjunction with the rotating speed of the rod 160, determines the width $L_3$ of the glass sheet 114a.

In this embodiment, the laser beam 152 of the $CO_2$ laser 150 may be directed on to the cylindrical shaped portion 111 of the glass bulb 114b with sufficient power to separate the glass sheet 114a from the glass bulb 114b along the direction of the separation path 112. As the glass bulb 114b continues rotating and moving, the cutting of the glass sheet 114a propagates along the direction of the separation path 112, and thus, results in an increase of the length of the cut glass sheet 114a. The heating of the $CO_2$ laser 150 along the separation path 112 creates the thermal affected zones (shown in FIGS. 1 and 2), generally being about 1 mm in width, on either side of the separation path 112. The high thermal stresses induced in the glass by the $CO_2$ laser 150 may cause cracks to develop and propagate in the glass directly adjacent to the thermal affected zone and parallel to the separation path 112. The cracks cause the thermal affected zone to separate from the remainder of the glass (i.e. from the glass bulb 114b and glass sheet 114a), as shown in FIG. 1C, leaving clean edges on each of the glass bulb 114b and the glass sheet 114a.

It will be apparent to those skilled in the art that various modifications and variations can be made to the present disclosure without departing from the spirit and scope of the invention. Thus, it is intended that the present invention cover the modifications and variations of this disclosure provided they come within the scope of the appended claims and their equivalents.

What is claimed is:

1. A method for cutting a fragile material (10) comprising the steps of:
   separating the fragile material along a separation path (12) into a first portion (14a) and second portion (14b) by heating the fragile material with a laser (50) along the separation path (12), wherein at least the first portion (14a) is separated from the second portion (14b) with the first portion (14a) including a first thermal affected zone (16a) extending along the separation path; and then
   subsequently splitting at least part of the first thermal affected zone from the remainder of the first portion along a first split path (18a) extending a first distance ($L_1$) laterally spaced from the separation path, wherein the subsequent splitting occurs as a consequence of heating the fragile material during the step of separating.

2. The method of claim 1, wherein the step of splitting provides the first portion (14a) with a first clean edge (22a) extending along the first split path (18a).

3. The method of claim 1, wherein heating during the step of separating is configured to provide internal stresses within the first portion (14a) sufficient to result in the step of splitting.

4. The method of claim 1, wherein the step of splitting includes propagating a first crack along the first split path (18a).

5. The method of claim 1, wherein the first distance ($L_1$) is substantially constant along the separation path (12).

6. The method of claim 1, wherein the second portion (14b) includes a second thermal affected zone (16b) extending along the separation path (12).

7. The method of claim 6, further comprising the step of subsequently splitting at least part of the second thermal affected zone (16b) from the remainder of the second portion (14b) along a second split path (18b) extending a second distance ($L_2$) laterally spaced from the separation path (12) after the step of heating, wherein the subsequent splitting of at least part of the second thermal affected zone (16b) occurs as a consequence of heating the fragile material (10) during the step of separating.

8. The method of claim 7, wherein the first distance ($L_1$) is substantially equal to the second distance ($L_2$).

9. The method of claim 1, wherein a thickness of the fragile material (10) is equal to or less than 150 μm.

10. The method of claim 1, wherein the fragile material (10) comprises a glass material.

11. The method of claim 10, wherein a coefficient of thermal expansion of the glass material is from 10 to $70 \times 10^{-7}$/K between 25-300° C.

12. The method of claim 1, wherein the laser (50) emits a wavelength between 10 μm and 11 μm.

13. The method of claim 1, wherein the laser (50) has a power from about 50 W to about 150 W during the step of heating.

14. The method of claim 1, wherein the step of heating is modified to accommodate changes in thickness of the fragile material (10).

15. The method of claim 1, wherein the fragile material (10) is heated at a speed from about 20 mm/s to about 60 mm/s along a direction of the separation path (12).

16. The method of claim 1, where the first split path (18a) is substantially parallel to the separation path (12).

17. The method of claim 7, where the second split path (18b) is substantially parallel to the separation path (12).

* * * * *